United States Patent [19]

Frich

[11] Patent Number: 6,000,770

[45] Date of Patent: Dec. 14, 1999

[54] LIBRARY BOOK BIN WITH A VERTICALLY ADJUSTABLE FLOOR

[76] Inventor: Mark R. Frich, 21 Ferndale St., Maplewood, Minn. 55119

[21] Appl. No.: 09/231,237

[22] Filed: Jan. 15, 1999

[51] Int. Cl.⁶ ................................................ A47B 88/12
[52] U.S. Cl. ................ 312/319.7; 312/71; 312/249.1; 312/306; 211/59.3
[58] Field of Search ............................. 312/249.1, 249.8, 312/319.1, 319.5, 319.7, 306, 312, 212, 71; 108/136, 144.11; 414/923, 925; 187/244; 211/1.57, 59.3

[56] References Cited

U.S. PATENT DOCUMENTS

| | | | |
|---|---|---|---|
| 2,919,168 | 12/1959 | Shivek | 312/71 |
| 3,339,795 | 9/1967 | Cappel | 312/306 X |
| 3,356,183 | 12/1967 | Shell | 312/319.7 X |
| 3,494,503 | 2/1970 | Kingsley | 312/306 |
| 3,694,044 | 9/1972 | Cummings | 312/71 |
| 3,937,095 | 2/1976 | Clymer | 312/319.7 |
| 3,993,373 | 11/1976 | Vershbow | 312/71 |
| 4,357,127 | 11/1982 | Kooiman | 414/925 X |
| 4,545,463 | 10/1985 | Olovsson | 187/244 |
| 4,629,072 | 12/1986 | Loew | 211/59.3 |
| 4,919,275 | 4/1990 | Futch et al. | 211/1.57 |
| 5,273,352 | 12/1993 | Saper | 312/319.7 X |
| 5,626,206 | 5/1997 | Weber er al. | 108/136 X |

*Primary Examiner*—Peter R. Brown
*Assistant Examiner*—James O. Hansen
*Attorney, Agent, or Firm*—Walter K. Roloff; Robert A. Pajak

[57] ABSTRACT

A mobile container or bin is provided with a vertically adjustable floor which is suspended by cables which pass through a plurality of supports or pulleys, and the cables are wound around a single cylindrical drive member coupled to a reversible motor with a power off brake. The cylindrical cable drive member is rotatably disposed about an axle passing through side wall members of the bin. The cylindrical cable drive member includes at least one pair of right hand and left hand spiraling grooves having a depth and width sufficient to wind the cables thereon in a single layer. An object level sensing sensor is mounted to the bin for sensing the presence or absence of objects above the floor at a pre-set access level. The sensor output is provided as an input to a control circuit for maintaining the highest most ones of the objects on the floor at the preset level so as to provide a constant object load and object unload floor level.

10 Claims, 7 Drawing Sheets

LIBRARY BOOK BIN WITH A VERTICALLY ADJUSTABLE FLOOR

FIELD OF THE INVENTION

The present invention relates generally to a storage receptacle or bin, and specifically to an automatic level-sensing bin for automatically sensing and adjusting height levels of objects placed therein, and more specifically to an automatic level-sensing bin for automatically sensing and adjusting height levels of library books and materials placed therein.

BACKGROUND OF THE INVENTION

Modern libraries have experienced increased demands from patrons, in terms of needs for larger and larger holdings of books and other tangible materials. Accordingly, it is not uncommon for public libraries, for example, to handle collection and distribution of hundreds of thousands, or even millions, of books and materials. Tasks of librarians in handling these ever increasing volumes are often overwhelming.

Particularly problematic librarian tasks involve receiving, sorting, and ultimately re-shelving material returned from patrons. Tasks of manipulating materials in receiving, sorting, and re-shelving, are tedious and have lead to repetitive stress-type physical injuries. These injuries result, for example, from repetitive bending of the librarian's body while reaching into a books and materials receiving area, then grasping each book or piece of material and lifting and/or moving it from the receiving area to a sorting area, and then finally again lifting and/or moving the material to a re-shelving area.

In attempts to minimize these problems, procedures have been developed to provide some degree of automation in such receiving, sorting, and re-shelving tasks. For example, librarians commonly employ wheeled carts to transport material to be re-shelved. However, use of such carts does not adequately address the "front end" problem associated with the aforementioned repetitive bending and lifting.

In general, aside from library applications, attempts have been made to respond to problems associated with repetitive bending, grasping, and lifting and/or moving materials.

For example, U.S. Pat. No. 4,357,127 entitled "Apparatus For The Stacking Of Objects" issued to Kooiman provides an apparatus for stacking objects, such as trays, plates, and the like, in which an uppermost one of the objects in a stack is maintained at a height independent of a number of objects in the stack. Kooiman teaches the use of a stack carrier contained within a vertically arranged open top container, with the stack carrier being suspended within the container by means of tension springs. The tension springs react in proportion to a load imposed upon them by a stack, thereby maintaining uppermost objects in the stack at a desired height.

In U.S. Pat. No. 4,545,463 entitled "Vertically Adjustable Picking Box" issued to Olovsson, a liftable and lowerable picking box for storing workpieces at a workplace is provided. Therein, a hydraulic foot-actuated pump provides a vertical lifting and lowering action on the box.

U.S. Pat. No. 4,629,072 entitled "Apparatus For Storing And Dispensing Stacked Articles" issued to Loew teaches the use of a torsion spring to provide presentation of an uppermost object in a stack at a predetermined height.

U.S. Pat. No. 4,919,275 issued to Futch, and U.S. Pat. Nos. 4,954,760 and 5,013,983 issued to Futch et al., each being entitled "Self Leveling Dispenser" disclose a rack supporting a stack of trays within a frame. A reversible motor connected to spiral shafts mounted at corners of the frame rotates the shafts in jackscrew-like fashion, to provide vertical movement of the rack. Further employed are sensors, which cause the reversible motor to be driven, with resultant shaft rotation and vertical movement of the rack. The sensors enable positioning of an uppermost tray in the rack to a desired vertical height position.

Yet another, U.S. Pat. No. 5,626,206 entitled "Device For And Method Of Vertically Adjusting Parts In A Bin" issued to Weber et al. teaches use of a scissors-type jack or suitable lifting means for lifting a platform that supports parts in a parts bin.

The aforedescribed patents however, and particularly the spring-loaded devices thereof, rely upon initial spring calibration and mechanical integrity of the spring systems. Furthermore, the motor or hydraulically driven devices are noisy and are not well suited to handling library materials in a library environment.

Commonly, a library employs use of an outside "drop box" for receiving returned library materials both for convenience and after hours receiving of the returned library materials. A "drop box" is sometimes used inside the library. Usually, ordinary deep well receiving carts or boxes are positioned below a chute associated with the "drop box" for receiving the library materials. Since the library materials are generally non-uniform and of differing kinds of materials (i.e., books, audio tapes, video tapes, and the like), the library materials will stack in these receiving carts in a totally random order.

A problem with aforementioned receiving carts is that when empty, the first received object or library material will fall from the vertical entrance point (the top of the cart) until stopped by the fixed position of the floor of the receiving cart, possibly causing damage to the received library material. As library materials continue to be received, the materials will randomly stack. The quantity of materials that are received by the cart is, of course, dependent upon the height of the walls of the cart. However, the higher the walls, the more difficult is the process of emptying in the cart, i.e., bending and reaching for the materials at the bottom of the receiving cart.

Thus, there exists a need for library receiving bin or container which has a floor which is maintained at substantially a constant height or pre-set access level for both loading objects into, or removing objects from the floor of the bin, which is easy to operate, and that provides quiet operation, and which accommodates the non-uniform and differing types of library materials.

SUMMARY OF THE INVENTION

An object of the present invention is to provide a bin for receiving objects deposited therein, which has automatic control system for maintaining the upper most objects stacked on the floor of the bin at a pre-set access level or height.

An object of the present invention is to provide a book bin for receiving library books and materials deposited therein, which has automatic level sensing of the receiving bin floor so that books which are added to the bin are never dropped more than a selected vertical distance from the top of the bin.

Another object of the present invention is to provide a bin that includes a vertically movable floor which is controllably positioned at a desired vertical height.

A still further object of the present invention is to provide a bin that has a vertically movable floor such that uppermost objects placed therein are maintained at a nearly constant selected vertical access level.

A yet further object of the present invention is to provide a bin that is easily mobile and transportable.

In accordance with the present invention, a mobile container or bin is provided with a vertically adjustable floor. The bin includes an open upper end for loading or unloading library books and materials onto or from the vertically moveable floor. The floor of the bin is suspended by a plurality of cables that hang from cable guides or pulleys. A cylindrical cable drive member is rotatably disposed about an axle passing through side wall members of the bin, in which the axle is parallel with the floor upon which the bin rests. The cylindrical cable drive member includes at least one pair of right hand and left hand spiraling grooves having a depth and width sufficient to wind a cable thereon. A reversible motor with a power off brake is mounted to the bin. The motor includes a rotatable shaft coupled to the cylindrical drive member such that rotation of the shaft in one direction causes the floor to be raised vertically, and rotation in the opposite direction causes the floor to be lowered vertically. An object level sensing sensor is mounted to the bin for sensing the presence or absence of objects above the floor at a pre-set access level. The sensor output is provided as an input to a control circuit for maintaining the highest most ones of the objects on the floor at a pre-set access level for easy loading such that objects are never vertically dropped greater than a pre-set distance from the top of the bin, and that the upper most objects are maintained at the pre-set access level for easy reach and unloading of the objects from the bin.

DETAILED DESCRIPTION OF THE INVENTION

Figure 1:
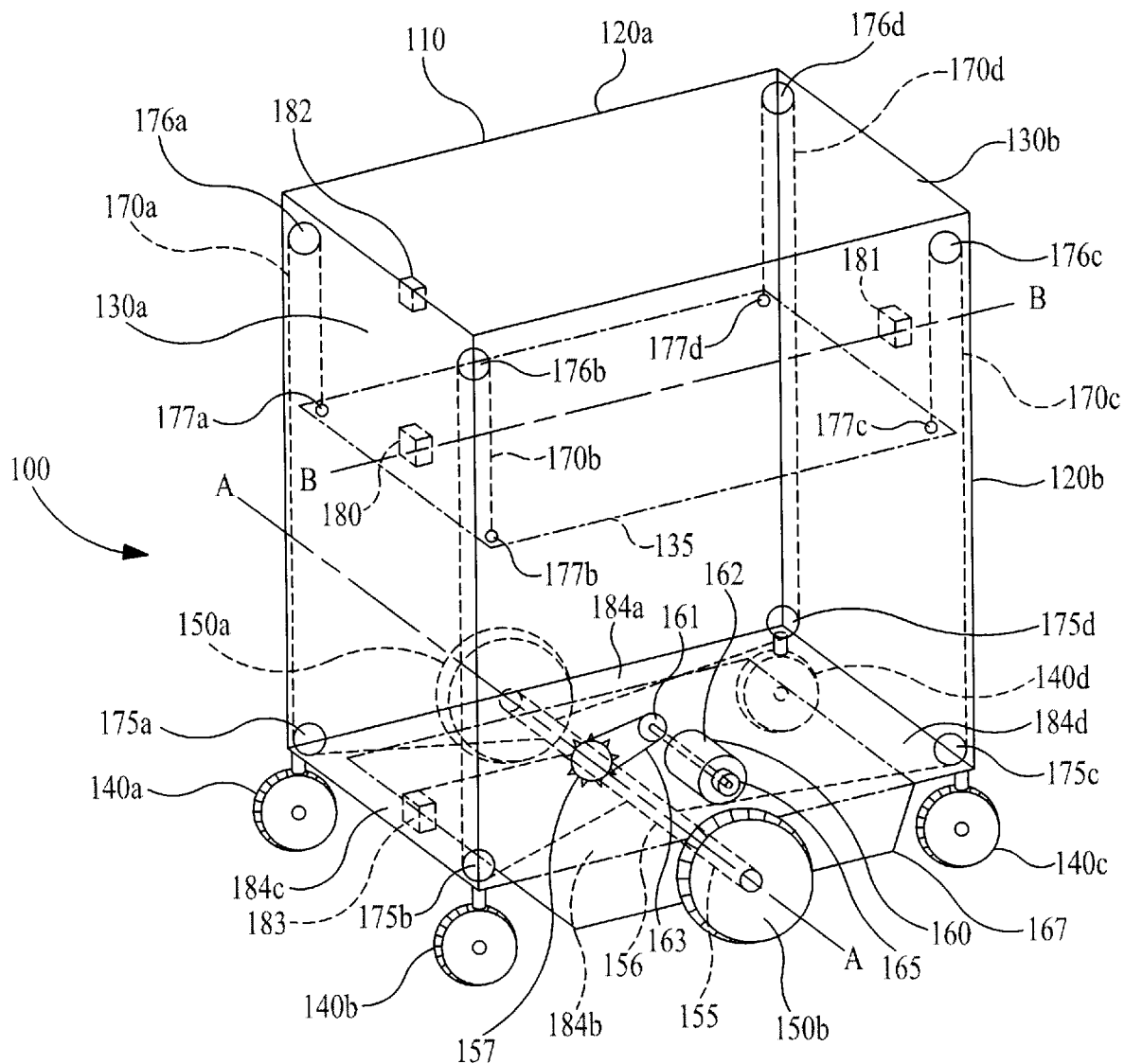
FIG. 1 is a perspective illustration of a book bin constructed in accordance with the present invention, and depicting an empty condition.
Figure 2:
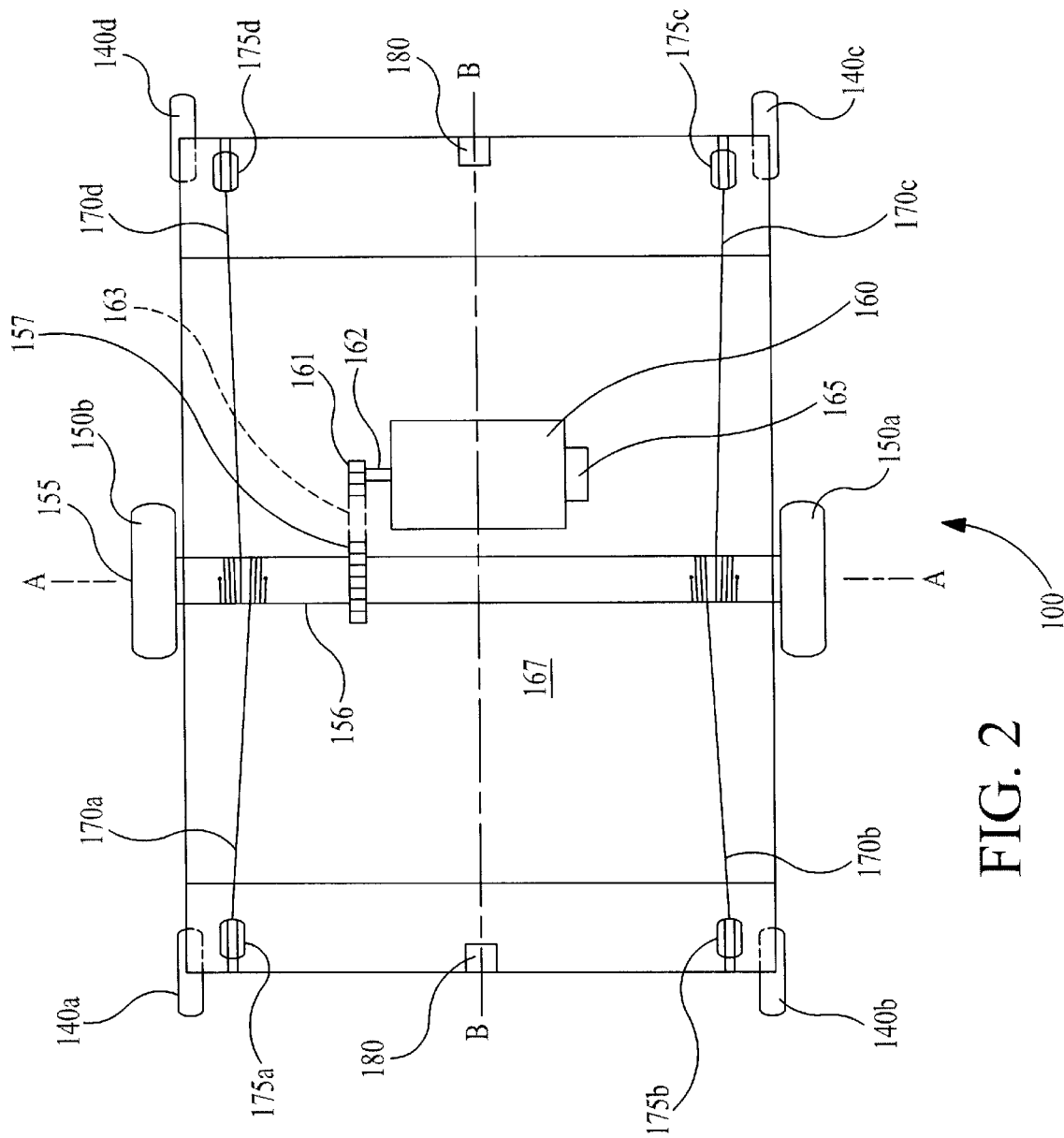
FIG. 2 is a plan view illustration of a book bin constructed in accordance with the present invention.
Figure 3:
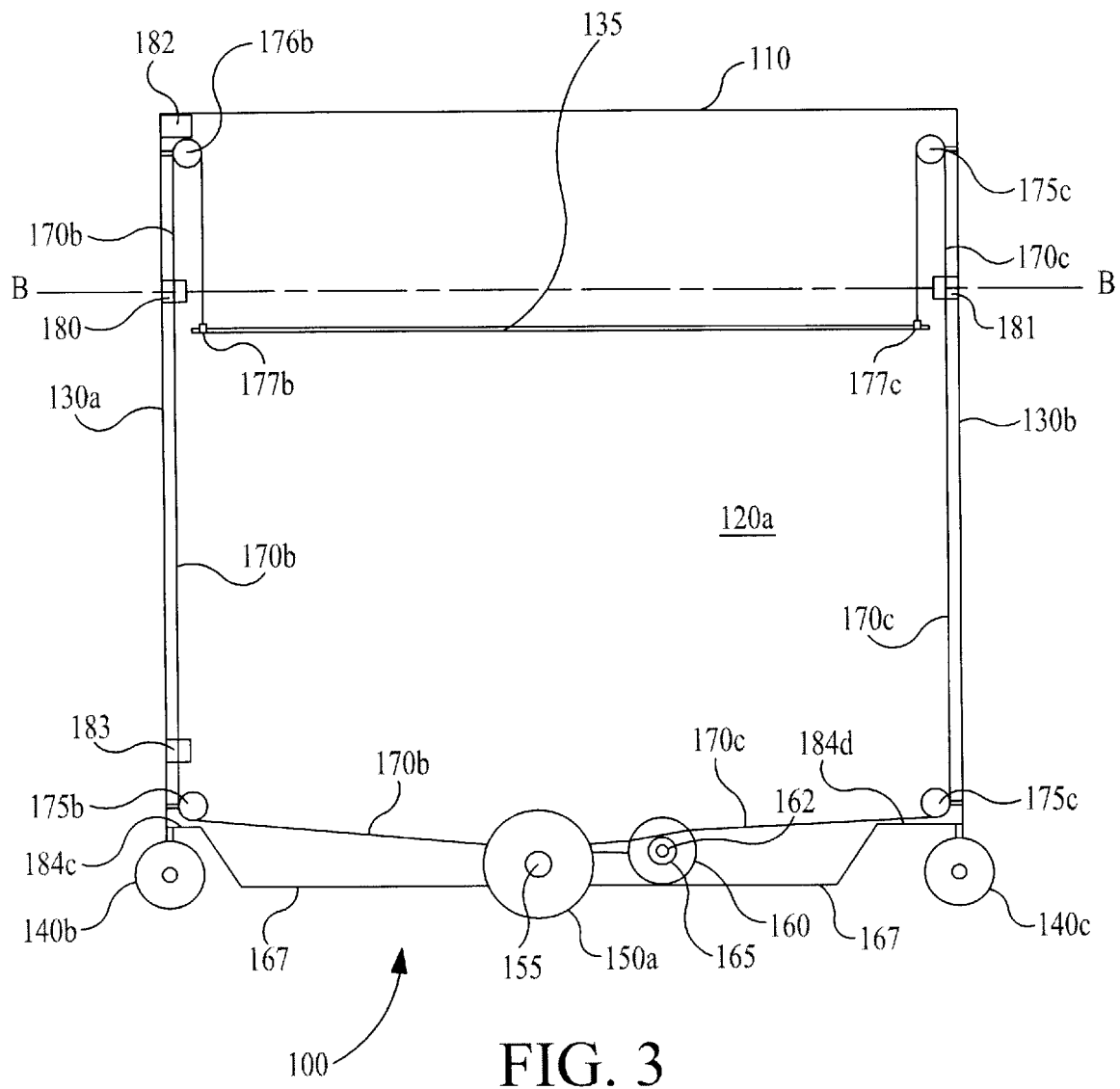
FIG. 3 is a side view illustration of the book bin constructed in accordance with the present invention.

Referring to FIGS. 1, 2, and 3, there shown is a perspective illustration bottom plan view, and side view, respectively, of the library book bin of the present invention. Therein, book bin 100 (hereinafter, "bin 100") is illustrated in transparent schematic fashion, so that inner details may be readily ascertained, as will now be described.

Bin 100 includes a generally rectangular or box-like open-top container or housing 110 forming a chamber by way of vertical opposing side wall members 120*a–b*, and forward and rearward wall members 130*a–b*, respectively. Bin 100 further includes a vertically adjustable horizontal floor member 135 (hereinafter, "floor 135") suspended and held in a horizontal position in parallel with the ground by way of cables 170*a–d*, successively passing through upper and lower cable guide members illustrated as upper pulleys 176*a–d* and upper pulleys 175*a–d*, respectively.

Ground mobility or transport of bin 100 is made possible by way of bin wheel members 140*a–d*, central pivot wheel members 150*a–b*, and an axle 155 which passes through cable drive member 156. For illustrative purposes, axle 155 and cable drive member 156 are shown as being aligned with a central reference axis A—A. Central reference axis A—A is preferably located equidistantly from opposing forward and rearward wall members 130*a–b*.

Bin 100 further includes a central sprocket 157 mounted onto cable drive member 156, and a drive motor 160 secured to a motor pan member 167. Drive motor 160 includes a motor shaft 162 having a drive sprocket 161 at one end thereof and a "power off" motor brake 165 coupled to the other end of motor shaft 162. A drive chain 163 couples motor drive sprocket 161 to central sprocket 157.

The vertical position of floor 135 is detected by an object level sensing means illustrated in FIG. 1 as including a signal sending unit 180 and a signal receiving unit 181 mounted to housing 110. Bin 100 further includes an upper limit sensing means 182 and a lower limit sensing means 183 secured to housing 110.

Housing 110, although illustrated in the Figures as a box-like shape, may be any desired shape (i) having an open top end for loading and unloading objects, (ii) which permits a vertically moveable floor to be raised or lower therein, and (iii) includes surrounding walls to hold objects on the floor as it is raised and lowered.

The vertical side wall members 120*a–b*, and forward and rearward wall members 130*a–b* may be structurally interconnected by a wide variety of techniques including, for example, use of lateral members 184*a–d* so as to form a structurally rigid open top container. Lateral members 184*a–d* may be formed right angle members associated with each wall member 120*a–b* and 130*a–b*, respectively. Opposing side wall members 120*a* and 120*b* are shown so as to lie in parallel planes with respect to each other and are each perpendicular to a ground plane upon which the aforementioned wheels rest. Similarly, opposing forward and rearward wall members 130*a* and 130*b* are illustrated as lying in parallel planes with respect to each other, but perpendicular to the parallel planes of side wall members 120*a–b*. Vertically moveable floor 135 is intended to be held in position so as to lie in a plane generally perpendicular to each of the parallel planes of side wall members 120*a–b* and 130*a–b*. In one embodiment of the invention, wall members 120*a–b* and 130*a–b*, and floor 135, are constructed from aluminum sheet material of sufficient thickness for constructing a structurally rigid container.

Wheel members 140*a–d* are intended to be secured at the four corners formed at bottom junctures of side wall members 120*a–b* with forward and rearward wall members 130*a–b*, and which are secured thereto in any suitable manner. In one embodiment of the invention, wheel members 140*a–d* are swivel-type wheeled casters, each having a 5" diameter and a 300 lb. capacity.

Axle 155 is intended to pass through side wall members 120*a* and 120*b* with cylindrical cable drive member disposed between side wall members 120*a* and 120*b*. Central pivot wheels 150*a–b* are intended to be secured to axle 155 at opposite ends of an axle 155 outside of side wall members 120*a* and 120*b*, respectively. Preferably central pivot wheels 150*a–b* are secured to axle 155 through a ball bearing arrangement, as will be further described.

Figure 4:
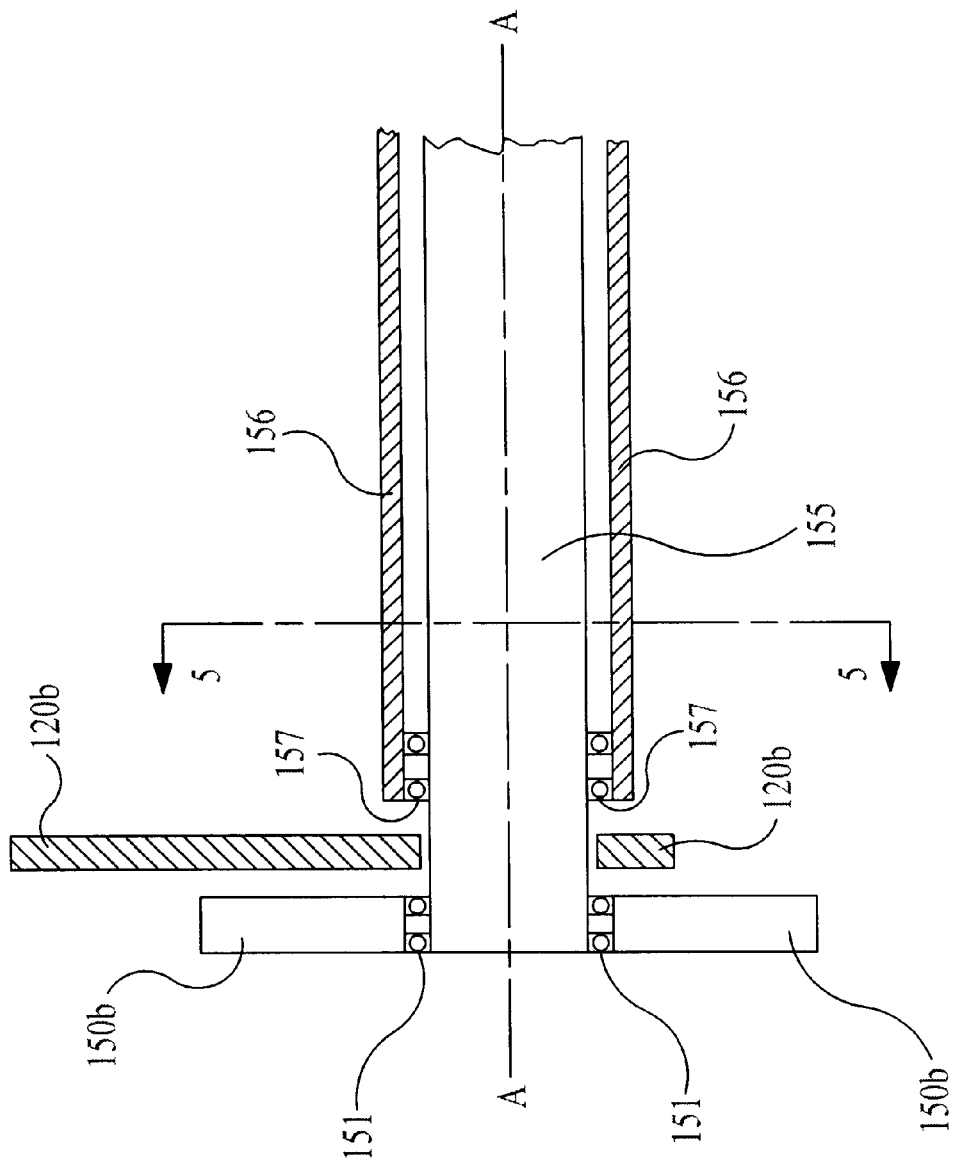
FIG. 4 is a side view illustration of certain components of FIG. 1.

FIG. 4 illustrates an arrangement of axle 155 with respect to one side wall 120*b* of housing 110 and corresponding pivot wheel member 150*b*, and cable drive member 156. Opposite side wall member 120*a* is not shown, but is similarly arranged. As illustrated, axle 155 is aligned with central reference axis A—A beneath floor 135, and is intended to be in parallel with the aforementioned ground plane upon which wheels 140*a–d* and central pivot wheels 150*a–b* may rest. Axle 155 passes through side wall members 120*a* and 120*b* and serves as an axle for wheels 150*a* and 150*b* which freely rotate about axle 155 through a ball bearing arrangement generally indicated by numeral 151. Axle 155 may be constructed from cold-rolled round bar steel, having a 0.75" diameter. Central pivot wheels 150*a* and 150*b* are secured to opposite ends of axle 155 by way of any well-known manner. Central pivot wheel 150*a–b* are, for example, wheel-only ball bearing wheeled casters each having a diameter of 8" and a 500 lb. capacity.

Figure 5:
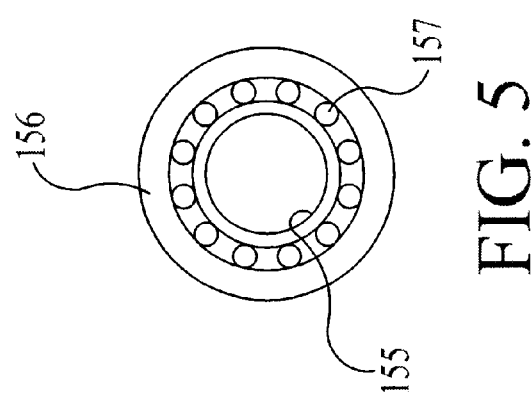
FIG. 5 is an end view illustration of certain components of FIG. 4.

Cable drive member 156 is illustrated as a cylindrical tube concentric with axle 155 passing therethrough. Cable drive member 156 is intended to freely rotate about axle 155 through a ball bearing arrangement generally indicated by numeral 157 as is particularly depicted in the plan view of FIG. 5.

Referring again to FIG. 2, there is shown a plan view of cable drive member 156 illustrating further details thereof as viewed from the top of bin 100 with floor 135 removed. Cable drive member 156 includes central sprocket 157 to accommodate drive chain 163, as will be further described. Central sprocket 157, in an exemplary embodiment of the present invention, is a 28-tooth roller-chain steel sprocket having a 1.880" to 1.890" bore.

Figure 6:
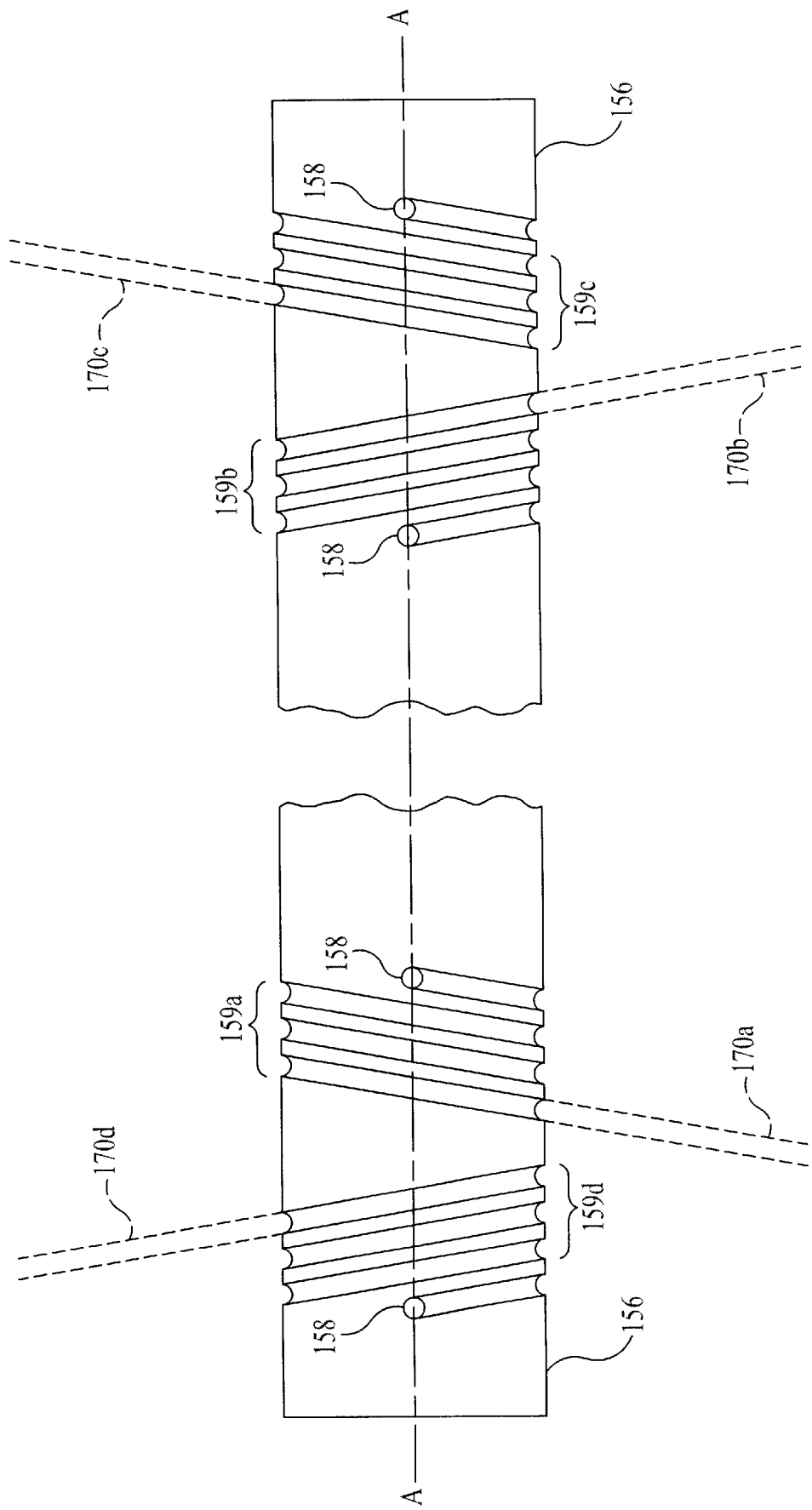
FIG. 6 is a magnified illustration of certain components of FIG. 1.

Referring to both FIG. 2, and the magnified partial plan view of cable drive member 156 illustrated in FIG. 6, cable drive member 156 includes spiraling grooves formed therein generally identified by numerals as 159*a–b* and 159*c–d* on opposite sides of central sprocket 157, respectively. Grooves 159*a–d* are provided so as to accommodate cables 170*a–d*. The depth and width of grooves 159*a–d* are intended to accommodate outer diameters of cables 170*a–d* so that the cables may be wound upon cable drive member 156 without any tangling of the cables—that is, a single layer of cable is capable of being wound on cable drive member 156.

Referring more particularly to FIG. 6, cable drive member 156 is illustrated as having right hand spiraling grooves 159*a* and 159*c*, and left hand spiraling groves 159*b* and 159*d*. Cable drive member 156 includes threaded holes 158 for attachment of an end of each of the cables 170*a–d* to cable drive member 156.

Motor pan member 167 is secured to a lower portion of housing 110 and generally forms a bottom member portion of housing 110. Drive motor 160 is securely attached to a central portion of motor pan member 167. At one end of motor shaft 162 of drive motor 160 is a drive sprocket 161. Drive chain 163 is driveably attached to drive sprocket 161 and to central sprocket 157 on cable drive member 156 such that a clockwise rotation of shaft 162 causes a clockwise rotation of cable drive member 156, and vise-a-versa.

In an exemplary embodiment of the present invention, drive motor 160 may be, for example, a 130 Vdc gearhead electric motor generating ⅛ hp. and providing a 14 rpm output. Associated with drive motor 160 is a reversible motor control 160*a* as particularly illustrated in the schematic diagram of FIG. 7. Drive chain 163 is, for example, an ANSI-standard #40½" pitch riveted-type roller chain.

In accordance with the present invention, a "power off" motor brake 165 is attached to drive motor 160 and coupled to motor shaft 162 of drive motor 160 passing therethrough. An example of motor brake 165 is a 120 Vac 0.06 amp. Bodine model #0977 FSBR power off brake providing a brake torque of 15 in.-lb. As illustrated in FIG. 2, motor brake 165 is coupled to a rearward portion of shaft 162 on a side of motor 160 opposite drive sprocket 161.

Referring again to FIGS. 2 and 6, cables 170*a–d* are attached, at one end each thereof, to cable drive member 156 by way of threaded mounting holes 158 and fastener therewith. As aforedescribed, cable drive member 156 includes spiraling grooves to receive cables 170*a–d* being wound thereupon in opposite directions. For example, cables 170*a* and 170*c* are wound around right-hand threaded spiraling groves 159*a* and 159*c*. In like manner, cables 170*b* and 170*d* are wound around left-hand threaded spiraling groves 159*b* and 159*d*.

As depicted more particularly in FIG. 1, cables 170*a–d* are threaded through bottom pulleys 175*a–d*, respectively. Successively, cables 170*a–d* are threaded through pulleys 176*a–d*, respectively. Opposite ends of each cable 170*a–d* are connected to floor 135, at each of four corners thereof at terminating tie points 177*a–d*. Cables 170*a–d* may be constructed from, for example, a cable having a diameter of ⁵⁄₃₂".

Each one of pulleys 175*a–d* and 176*a–d* are attached, respectively, to housing 110 near a juncture of a corresponding wall member 120*a–b* and 130*a–b*, respectively. For example, pulley 175*a* is attached to housing 110 near a bottom juncture of side wall member 120*a* with forward wall member 130*a*. As illustrated, pulleys 175*a–b* and 176*a–b* are mounted to forward wall member 130*a*, and pulleys 175*c–d* and 176*c–d* are mounted to rearward wall member 130*b*. Lower pulleys 175*a–d* are intended to lie in a plane generally in parallel with the ground plane and generally aligned with axle 155 and cylindrical drive member 156. Similarly, upper pulleys 176*a–d* are intended to also lie in a plane generally aligned with the ground plane at the upper portion of housing 110.

Bin 100 further includes object level sensing means illustrated in the Figures as cooperating and aligned sensor elements 180 and 181 secured to forward and rearward wall members 130*a–b*, respectively. Sensor elements 180 and 181 may be, for example, visible beam photo-eye receiver/ sender elements. Sensor elements 180 and 181 are operatively arranged so as to control drive motor 160, as will be more fully described with reference to the schematic block diagram arrangement depicted in FIG. 7.

Figure 7:
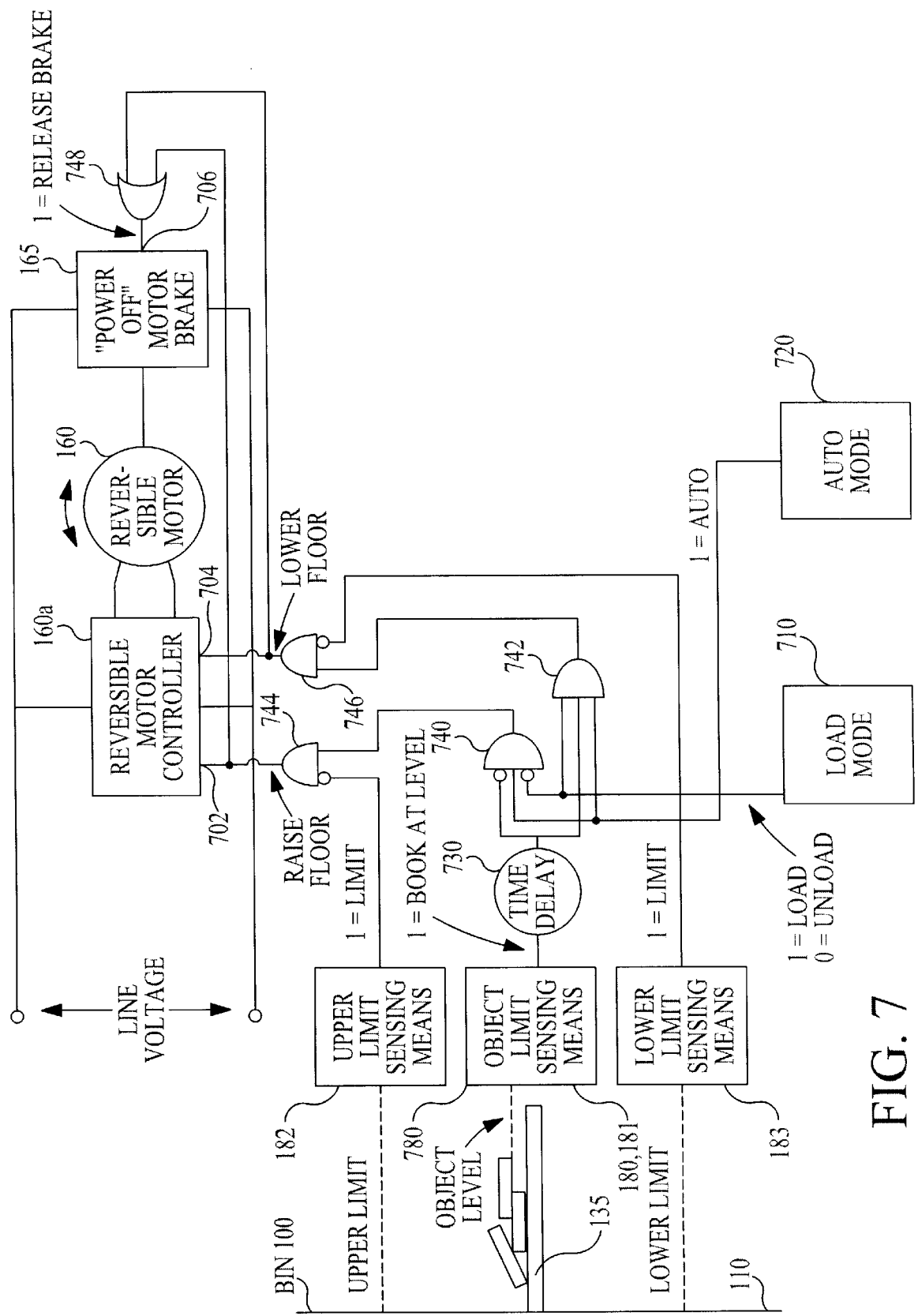
FIG. 7 is a schematic block diagram of an electric circuit in accordance with the present invention.

FIG. 7 is a schematic block diagram illustrating a control circuit in accordance with the present invention for raising and lowering the floor 135 for either loading or unloading objects onto or from the bin 100. Power is applied to both reversible motor controller 160*a* and "power off" motor brake 165. For convention purposes, a clockwise shaft rotation causes floor 135 to raise, and a counter-clockwise rotation causes the floor 135 to be lowered by the corresponding rotation of cable drive member 156.

Controller 160*a* is operative to cause the shaft 162 of motor 160 to turn CW upon receiving a logical one at input means 702, and turn CCW upon receiving a logical one input at input means 704. A logical one input to motor brake 165 at input 706 causes the brake upon shaft 162 to be disengaged.

In accordance with the present invention, a upper limit sensing means 182 is secured to housing 110 at any convenient upper location to provide a safety upper vertical limit which floor 135 is intended not to exceed. Similarly, a lower limit sensing means 183 is secured to housing 110 at any convenient lower location to provide a safety lower vertical limit which floor 135 is intended not to exceed.

An object level sensing means 780, by way of sending unit 180 and receiving unit 181, is intended to sense the presence or absence of an object or objects at any desired set "object level." For convention purposes, upper limit sensing means 181 provides a logical "1" whenever the floor 135 has reached the upper vertical limit level. Similarly, lower limit sensing means 183 provides a logical "1" whenever the floor 135 has reached the lower vertical limit level. Also, object level sensing means 780 provides a logical "1" whenever objects are sensed at the desired object level.

In the preferred embodiment of the invention, the output of object level sensing means 780 is passed through a time delay generally indicated by numeral 730. The output of time delay 730 has the same logical output of object level sensing means 780, but delayed in time relative to a changing output state of object level sensing means 780. Time delay 780 is provided so that false objects, such as a hand or the like passing between the sending and receiving unit 180 and 181, does not initiate any action, and that only real objects cause the desired action.

In accordance with the present invention, a load mode switch 710 is provided which provides a logical "1" when the bin 100 is intended to be loaded with objects, and a logical "0" when the bin 100 is intended to be unloaded. An auto mode switch 720 is provided to enable the automatic operation of the system, as opposed to being controlled by an independent manual control thereof (not shown). Auto mode switch 720 is intended to provide a logical "1" whenever it is desired to operate the system in automatic mode, and logical "0" when it is desired to operate the system manually.

A logical AND gate 740 logically combines the output of time delay 730 through an inverting input, the output of auto mode switch 720 at another input, and the output of load mode switch 710 through another inverting input. Logical AND gate 742 logically combines the output of time delay 730, the output of auto mode switch 720 at another input, and the output of load mode switch 710 at another input.

In turn the output of AND gate 740 is provided as an input to AND gate 744 along with the output of upper limit sensing means 182 through an inverting input. The output of AND gate 742 is provided as an input to AND gate 746 along with the output of lower limit sensing means 183 through an inverting input. In turn the output of AND gate 744 provides an input to raise floor input 702 (CW) of reversible controller 160a, and also as an input to OR gate 748. The output of AND gate 746 provides an input to lower floor input 704 (CCW) of reversible controller 160a, and also as an input to OR gate 748.

The operation of the control system in accordance with the present invention as illustrated in FIG. 7 will now be described. In the first scenario, consider the condition of bin 100 when the bin is empty or the floor 135 has been manually raised to the upper limit, and load mode switch 710 is in the load state, and auto mode operation is selected. In these circumstances, the positions of the sensing components 780, 182, and 183 are such that object level sensing means does not sense any objects. Accordingly, the motor is off and the brake is engaged since the output of both AND gates 740 and 742 will be in a logical "0" state. Also, in this scenario, AND gate 740 is a logical "0."

As books are added onto the floor 135, the object level sensing means 780 will detect the objects and cause the AND gate 742 to change state after the time delay (730), and in turn cause AND gate 746 to change to a logical "1" causing the motor brake 165 to be released through OR gate 748, and the motor to turn on to lower the floor (input 704). The floor will be lowered until object level sensing means 780 detects the absence of objects and changes state, thereby changing the state of AND gate 742 causing the motor to turn off and once again engaging the brake. This cycle will continue until either the lower limit is reached, or either load mode switch 710 changes to the state of UNLOAD, or auto mode switch 720 is changed to manual thereby changing state.

Consider now when it is desired to unload the objects of the previous scenario and where the floor is either at the lower limit or anywhere below the upper limit. In these circumstances, AND gate 742 is forced to a logical "0." Depending upon the level of the objects, AND gate 740 will be in either logical state depending upon the logical output of object level sensing means 780. If objects are sensed, AND gate 740 will be a logical "0" and the motor will be off and the brake will be engaged. If no objects are sensed, AND gate 740 will be a logical "1," causing the brake to be disengaged and causing the motor to cause the floor to be raised (702) through AND gate 744. The floor will be raised until either objects are sensed or the upper limit is exceeded. This cycle will continue until either the upper limit is reached, or either the load mode switch 710 changes to the LOAD state, or auto mode is turned off and changes state.

It should be noted that the control system as just described and depicted in FIG. 7 may be provided by a wide array of circuit components and techniques, including both electronic, electromechanical, and computer controlled, and the like. Of course, each of the logic gates may be implemented by control relays and contact as particularly illustrated in schematic diagram depicted in FIG. 8.

Figure 8:
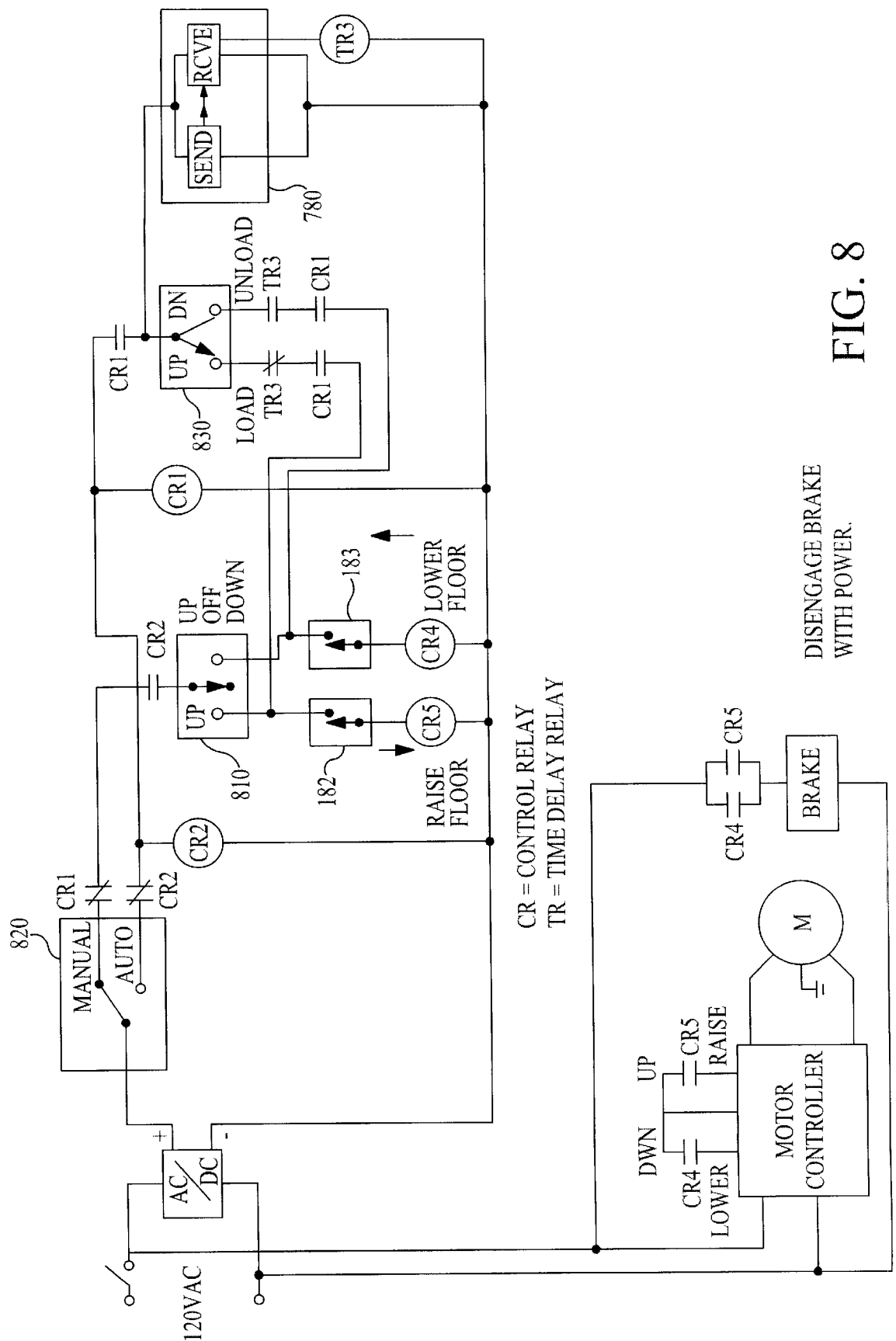
FIG. 8 is another schematic block diagram of an electric circuit in accordance with the present invention.

Referring particularly to FIG. 8, thereshown is an electrical circuit arrangement for manual operation of the reversible motor. Blocks identified as "CR" represent control relays having corresponding numerically identified relay contact pairs, and "TR" represents timed delay relays having corresponding numerically identified relay contact pairs. A rocker switch 810 with center off may be used in combination with upper and lower limit sensing means 182 and 183, respectively. In these circumstances, the auto mode is disabled through switch block 820, and the direction of the floor is determined by manual operation of rocker switch 810. Switch block 830 is a manual decision block selecting either load or unload operation.

It should also be noted that the upper and lower limit sensing means 182 and 183 may be implemented a wide variety of switches and techniques including, among others, magnetically operated proximity switches (e.g., a magnet mounted on floor 135 and magnetically operated switches) or mechanically actuated switches like those illustrated in FIG. 1 and designated numeral 182 and 183.

Further, object level sensing means 780 may be also implemented by a wide array of sensing devices. These may include a simple light sensing device ("electric-eye"), infrared, light emitting diode and laser diode combinations, and the like. In accordance with the present invention, any sensing means which can detect the presence or absence of objects on floor 135 is intended to be within the scope of the present invention.

In one exemplary operation of bin 100, and specifically in a library book loading operation, floor 135 may be initially positioned at a top location of bin 100, corresponding to a full-up travel state or position of floor 135. This top location may be just beneath a horizontal reference axis B—B between sensor elements 180 and 181. Furthermore, this full-up travel position of floor 135 is determined by an upper limit sensing means generally depicted by numeral 710 as illustrated in FIG. 1, and also in the schematic diagram of FIG. 7.

As library books (not illustrated) are placed in bin 100, on floor 135, the books typically "pile up" on floor 135 in a random manner. It should be appreciated that in a library application of bin 100, books may "spill" into bin 100 from a library book drop or chute (not shown) in any well-known manner. As such piling up of books occurs, the presence of books is eventually sensed by sensor elements 180 and 181. In one embodiment of bin 100, sensor elements 180 and 181 are positioned opposite each other and are each aligned with the aforesaid reference axis B—B defining a pre-set access level. In this arrangement, sensor elements 180 and 181 are in communication through light emission by one element as a sender unit, for instance element 180 (hereinafter, "sender element 180"), and by light detection by the other as a receiver unit, for instance element 181 (hereinafter, "receiver element 181"), in a well-known operation of such photo-eye devices. In turn, receiver element 181 is operative to generate an electrical signal whenever light from sender element 180 is not received by receiver element 181 or permit operation of time delay switching relay TR3 as illustrated in FIG. 8.

Thus, as objects such as books pile up on floor 135 as aforesaid, they eventually will interrupt or block the light beam generated by sender element 180, and consequently the light will not be received by receiver element 181.

As aforesaid, in turn, receiver element 181 then responsively generates a signal, which is then transmitted to drive motor 160 after being run through the circuit of FIG. 7. This signal received at drive motor 160 causes actuation of drive motor 160, that in turn drives drive chain 163. The driving of drive chain 163, itself being connected to central sprocket 157 on cable drive member 156, causes central sprocket 157 and cable drive member 156 to turn. This turning action of cable drive member 156 causes cables 170*a–d* to be either wound, or unwound, about cable drive member 156. In effect, then, the winding or unwinding action of cable drive member 156 causes cables 170*a–d* to be simultaneously either shortened or lengthened, respectively, relative to a distance relationship of cable drive member 156 to floor 135, along each cable 170*a–d*. Since cables 170*a–d* are attached at each end thereof to floor 135, the relative shortening or lengthening of cables 170*a–d* causes, in turn, floor 135 to be raised or lowered, respectively. This happens until the light beam is again restored, which causes the signal to be neither generated nor transmitted and motor action is stopped. Upon this occurrence, the motor brake is engaged, to smoothly stop the cable drive member.

In the aforementioned description of FIGS. 7 and 8, a decision must be made as to a choice of either intending to load or unload the bin to cause the appropriate action, i.e., raising or lowering floor 135 to maintain the uppermost objects on the floor to be at a pre-set access level. This is particularly depicted in FIG. 8 by switch block 830. However, fully automatic operation is possible by employment of an additional object level sensing means as illustrated and described in the aforementioned Futch patents, herein incorporated by reference thereto. In the fully automatic operation, the combination of upper and lower object sensing means separated by a small separation vertical distance permits detection of the uppermost objects on the floor to be between the two object sensing elements. Of course, there are a wide array of circuit implementations that are possible in order to provide the intended function, all of which are intended to be within the true spirit and scope of the present invention.

The bin in accordance with the present invention is particularly suited for a receiving cart for library materials, since the vertical position of the floor is maintained at substantially a constant height or pre-set access level for both loading objects into, or removing objects from the bin, which is easy to operate, accommodates non-uniform and in differing types of library materials, and which objects never "fall" a large vertical drop to the "bottom" of the bin. Furthermore, the bin in accordance with the present invention is particularly suited for applications where the objects intended to be loaded or unloaded are non-uniform and are varying types of materials, for example, materials and packages handled by a post office or shipping company.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results.

More particularly, upper and lower cable guides of varying structure may be substituted for the pulleys depicted in the drawings. The control circuit for operating the motor may also be implemented by wide array of techniques as aforesaid. The choice of sensors for the various limit switches and object sensing means may of course be provided by a wide array of mechanical, electrical, and electronic sensing devices and switches. Lastly, the choice, of course, of the mechanical size and strength of various components are all a matter of design choice depending upon the desires of the use and the objects intended to be received by the bin.

Accordingly, these and other various changes or modifications in form and detail of the present invention may also be made therein, again without departing from the true spirit and scope of the invention as defined by the appended claims.

What is claimed is:

1. A bin with a vertically adjustable floor, comprising:
    a bin housing having a chamber defined, in part, by a pair of opposing first and second side wall members and opposing forward and rearward members and including an upper open end;
    a plurality of upper and lower cable guides attached to upper and lower portions of said bin housing;
    a cylindrical cable drive member rotatably disposed about an axle passing through said first and second side wall members, said cylindrical cable drive member being disposed between said first and second side wall members, said cylindrical drive member including at least one pair of right hand and left hand spiraling grooves having a depth and width sufficient to wind a cable therein;
    a floor member suspended by,
        at least a first cable having a first cable end attached to a first location of said floor member, said first cable successively disposed on a first upper cable guide disposed on a first lower cable guide wound around said right hand spiraling grooves, and attached to said cable drive member at a second cable end thereof, and at least a second cable having a first end attached to a second location of said floor member, said second cable successively disposed on a second upper cable guide disposed on a second lower cable guide wound around said left hand spiraling grooves, and attached to said cable drive member at a second cable end thereof;

a reversible motor mounted to said bin and including a rotatable motor shaft;

coupling means for coupling rotational motion of said rotatable motor shaft of said reversible motor to said cylindrical drive member such that rotational motion in a first direction of said motor shaft causes clockwise motion of said cylindrical drive member, and rotational motion in a second direction of said motor shaft causes counter-clockwise motion of said cylindrical drive member; and said first and second cables are wound on said right and left hand spiraling grooves such that rotation of said cable drive member in one direction causes said floor to be lowered relative to said upper cable pulleys, and rotation in an opposite direction causes said floor to be raised relative to said upper cable pulleys.

2. The bin of claim 1 further comprising:

object level sensing means secured to said housing for detecting the presence or absence of objects on said floor at a pre-set access level;

control means responsive to said object level sensing means for selectively, causing said floor to be lowered as objects are stacked upon said floor during a loading cycle so as to lower said floor to a position at which said objects are just below said pre-set access level; and causing said floor to be raised as objects are removed from said floor during an unloading cycle so as to raise said floor to a position at which said objects are just above said pre-set access level.

3. The bin of claim 2 wherein said motor is mounted to said bin so that said shaft is substantially in parallel with said cylindrical drive member.

4. The bin of claim 3 further comprising:

a first chain sprocket rotatably coupled to one end of said motor shaft;

a second chain sprocket rotatably coupled to said cylindrical drive member; and a loop of chain for coupling said first and second chain sprockets.

5. The bin of claim 2 further comprising:

first and second wheels secured, respectively, to each of opposite ends of said axle; and wherein said axle passes through a lower portion of said first and second side wall members so that said first and second wheels may rest on a ground plane and may pivot thereon upon a turning motion about a vertical axis passing through said bin.

6. The bin of claim 5 wherein said cylindrical drive member is rotatably disposed about said axle through a ball bearing arrangement.

7. The bin of claim 5 further comprising a plurality of caster wheels secured to a bottom portion of said bin so that said bin may be transported on central wheels and said plurality of caster wheels.

8. The bin of claim 2 further comprising:

an object level sensing means secured to said housing for providing an output indicative of the presence or absence of any object stacked on said floor at said pre-set access level; and motor control means responsive to said object level sensing means for selectively causing said motor to rotate said motor shaft so as to maintain an uppermost object stacked on said floor at said pre-set access level.

9. The bin of claim 1 further comprising:

object level sensing means secured to said housing for detecting the presence or absence of objects on said floor at a pre-set access level;

control means responsive to said object level sensing means for controlling said reversible motor for selectively, (i) causing said floor to be lowered as objects are stacked upon said floor during a loading cycle so as to lower said floor to a position at which said objects are just below said pre-set access level, and (ii) causing said floor to be raised as objects are removed from said floor during an unloading cycle so as to raise said floor to a position at which said objects are just above said pre-set access level.

10. The bin of claim 1 wherein:

said cylindrical cable drive member further includes a second pair of right hand and left hand spiraling grooves, having a depth and width sufficient to wind a cable therein; and said floor member is further suspended by, a third cable having a first end attached to a third location of said floor member, said third cable successively disposed on a third one of said upper cable guides, disposed on a third one of said lower cable guides, wound around said left hand spiraling groove of said second pair of spiraling grooves, and attached to said cable drive member at a third cable end thereof, and a fourth cable having a first end attached to a fourth location of said floor member, said fourth cable successively disposed on a fourth one of said upper cable guides, disposed on a fourth one of said lower cable guides, wound around said right hand spiraling groove of said second pair of said spiraling grooves, and attached to said cable drive member at a fourth cable end thereof.

* * * * *

UNITED STATES PATENT AND TRADEMARK OFFICE
CERTIFICATE OF CORRRECTION

PATENT NO. : 6,000,770
DATED : December 14, 1999
INVENTOR(S) : Mark R. Frich It is certified that error appears in the above-identified patent and that said Letters Patent is hereby corrected as shown below:

Title page, item [56] References Cited, insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 1 | 7 | 6 | 3 | 1 | 5 | 01-05-1993 | Randall J. Homel | | |

Signed and Sealed this

Sixth Day of June, 2000

Attest:

Q. TODD DICKINSON

*Attesting Officer*         *Director of Patents and Trademarks*